US 8,276,001 B2

United States Patent
Kim

(10) Patent No.: US 8,276,001 B2
(45) Date of Patent: Sep. 25, 2012

(54) APPARATUS AND METHOD FOR CONROLLING POWER SUPPLIED TO BOTH PROCESSING SYSTEM AND BATTERY

(75) Inventor: Jong-Min Kim, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 379 days.

(21) Appl. No.: 12/609,254

(22) Filed: Oct. 30, 2009

(65) Prior Publication Data

US 2010/0115298 A1 May 6, 2010

(30) Foreign Application Priority Data

Oct. 31, 2008 (KR) .................. 10-2008-0107509

(51) Int. Cl.
*G06F 1/00* (2006.01)
(52) U.S. Cl. ...................................... 713/300
(58) Field of Classification Search ............... 713/300
See application file for complete search history.

(56) References Cited

U.S. PATENT DOCUMENTS

| | | | | |
|---|---|---|---|---|
| 6,396,169 | B1* | 5/2002 | Voegeli et al. | 307/52 |
| 7,058,480 | B1* | 6/2006 | Kawanishi et al. | 700/286 |
| 7,483,797 | B2* | 1/2009 | Nambu | 702/60 |
| 7,581,130 | B2* | 8/2009 | Carroll et al. | 713/340 |
| 2002/0194517 | A1* | 12/2002 | Cohen et al. | 713/340 |
| 2003/0080630 | A1* | 5/2003 | Liu | 307/150 |
| 2004/0150944 | A1* | 8/2004 | Byrne et al. | 361/683 |
| 2007/0022311 | A1* | 1/2007 | Park | 713/310 |
| 2008/0162973 | A1* | 7/2008 | Landry et al. | 713/340 |

* cited by examiner

*Primary Examiner* — Mohammed Rehman
(74) *Attorney, Agent, or Firm* — Cha & Reiter, LLC

(57) ABSTRACT

An apparatus and method for adaptively changing a constant power level of a system in compliance with a current system specification can improve safety issues such as overheating, due to excess charging capacity. After purchase/after market add-ons to the system made by a customer can change the load such that the present invention adaptively changes the constant power level supplied to match the after initial purchase add-ons. The method includes acquiring system specification information, searching for a constant power level corresponding to the acquired system specification information, and changing a constant power level according to the searched constant power level.

18 Claims, 2 Drawing Sheets

APPARATUS AND METHOD FOR CONROLLING POWER SUPPLIED TO BOTH PROCESSING SYSTEM AND BATTERY

CLAIM OF PRIORITY

This application claims priority under 35 U.S.C. §119(a) from a Korean Patent Application filed in the Korean Intellectual Property Office on Oct. 31, 2008 and assigned Serial No. 10-2008-0107509, the contents of which are herein incorporated by reference in its entirety.

BACKGROUND OF THE INVENTION

1. Field of the Invention

The present invention relates to an apparatus and method for adaptively changing a constant power level of a system in compliance with a system specification. More particularly, the present invention relates to an apparatus and method for, to stably supply a constant power of a system power source.

2. Description of the Related Art

In order to meet consumer demand for ever-faster processing capability in a terminal, such as a notebook computer, manufacturers have instituted changes in hardware such as a Central Processing Unit (CPU), a graphic chipset, a memory, etc. in the same main board. The manufacture of a terminal in compliance with diverse system specifications has been provided to the consumer in an attempt to meet consumer demand.

A person of ordinary skill in the art can appreciate that the CPU, graphic chipset, memory, etc. are usually responsible for most of power consumption of in a system for terminals of this type. Depending on a sum of the power consumption by all the items in such terminals, the manufacturer differentially determines a capacity of a power source supplied to each system. Here, the capability of the power source supplied to the system means a capability of an adapter.

The manufacturer determines a suitable adapter capability by to provide appropriate resources to several main boards in order to satisfy various system specifications. As a result of such a determination of suitable adapter capability, resultantly, the manufacturer constructs the main board with different variations depending on the adapter capability.

For example, if the adapter and a system external power source, simultaneously supplies power to a system and a battery, the adapter will gradually decrease power supplied to the battery at a predetermined power level or more. After that, at a time the power supply to the battery is equal to zero, the adapter supplies power only to the system. Here, the power level at which the power supply to the battery decreases is referred to as a constant power level preset to the system. The adapter has to maintain a constant power of the system according to the constant power level in order to stably supply a power source to the system.

In order to maintain a constant power of a system within a main board, a constant power level within the main board has to be set differently depending on the capabilities of an adapter. In the case of a low capability adapter, if a constant power level is too high compared to capability, a safety accident such as adapter overheating, etc. occurs. On the contrary, in the case of a high capability adapter, if a constant power level is too low compared to capability, a problem of an increase of a battery charge time, etc. occurs, thus resulting in user's dissatisfaction. As such, the constant power level within the main board has to be set differently on a per-adapter-capability basis. Thus, the main board has to be constructed with a number of variations to accommodate the different constant power levels of the various adapter capabilities. If the main board is constructed with a number of variations to due varying adapter capabilities, there is a problem in that improperly combined main boards constitute a system by a management or worker mistake.

Also, it can occur that, as a consumers exchange or add, for example a CPU, a graphic chipset, a memory, etc. to the system after purchasing the system, the current system specification becomes different than the previous system specification at the time of original purchase. In this case, because of the improvement of performance of the changed system specification compared to the previous system specification, a system load increases, however, a constant power level set to the system by a manufacturer is kept as it is. If the same constant power level as a previous one is kept despite the increase of the system load as above, because system power and charge power are simultaneously supplied and the system load is high, the system power and charge power can fast exceed a capability of an adapter, thus resulting in overheating, etc. Here, in order to minimize the excess of the adapter capability and prevent the overheating, etc., the charge power has to be decreased through a decrease of the constant power level. In fact, the overheating issue is a potential safety hazard.

Thus, there is a need for a scheme that automatically changes a constant power level in compliance with current system specifications, thereby minimizing an excess of a capability of an adapter and preventing overheating, etc.

SUMMARY OF THE INVENTION

An exemplary aspect of the present invention is to provide an apparatus and method for adaptively changing a constant power level of a system in compliance with a changing system specification.

Another exemplary aspect of the present invention is to provide an apparatus and method for, to stably supply a constant power of a system power source, determining a system constant power level in compliance with a system specification and, if a consumer subsequently changes the system specification, automatically changing the constant power level of the system in accordance with the changes made by the consumer.

A further exemplary aspect of the present invention is to provide an apparatus and method for determining a load level of a system using system specification information, searching for a constant power level corresponding to the determined load level, and adaptively changing a constant power level of the system.

The above exemplary aspects are achieved by providing an apparatus and method for adaptively changing a constant power level of a system in compliance with a system specification.

According to one exemplary aspect of the present invention, a method for changing a constant power level of a system is provided. The method includes acquiring system specification information, searching for a constant power level corresponding to the acquired system specification information, and changing a constant power level according to the searched constant power level.

According to another exemplary aspect of the present invention, an apparatus for changing a constant power level of a system is provided. The apparatus includes a system specification information acquiring unit, a constant power level searching unit, and a constant power level adaptive changing unit. The system specification information acquiring unit acquires system specification information. The constant power level searching unit searches for a constant power level corresponding to the acquired system specification information. The constant power level adaptive changing unit changes a constant power level according to the searched constant power level.

BRIEF DESCRIPTION OF THE DRAWINGS

The above features and advantages of the present invention will become more apparent from the following detailed description when taken in conjunction with the accompanying drawings in which.

DETAILED DESCRIPTION

Preferred exemplary embodiments of the present invention will be described herein below with reference to the accompanying drawings. In the following description, well-known functions or constructions may not be described when their inclusion could obscure appreciation of the invention by a person of ordinary skill in the art with such well-known functions or constructions.

The following exemplary description pertains to an apparatus and method for determining a load level of a system using system specification information, searching for a constant power level corresponding to the determined load level, and adaptively changing a constant power level of the system.

The system specification information can include, for example, information on processing speeds or capabilities of various parts of the system, such as, for example, a Central Processing Unit (CPU), a graphic chipset, a memory, etc. mounted on a main board. In an exemplary embodiment of the present invention, the processing speeds of the CPU, graphic chipset, and memory are described below, as an example. Here, the load level is to stepwise classify a load of a system based on a reference value.

Figure 1:
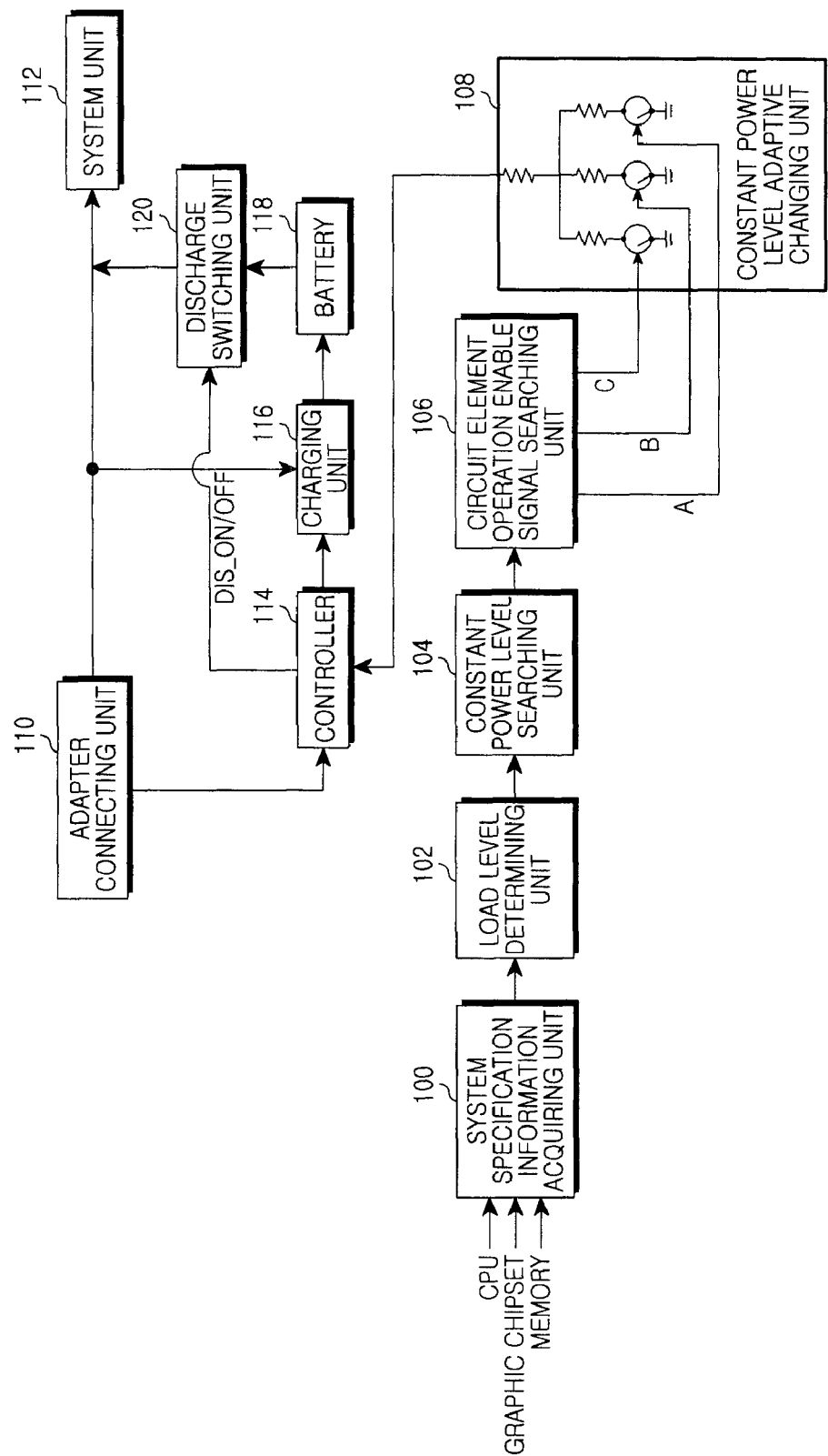
FIG. 1 is a block diagram illustrating a construction of an apparatus for adaptively changing a constant power level in compliance with a system specification according to the present invention.

FIG. 1 is a block diagram illustrating an exemplary construction of an apparatus for adaptively changing a constant power level in compliance with a system specification according to the present invention.

As illustrated in the example shown in FIG. 1, the apparatus typically includes items such as a system specification information acquiring unit 100, a load level determining unit 102, a constant power level searching unit 104, a circuit element operation enable signal searching unit 106, a constant power level adaptive changing unit 108, an adapter connecting unit 110, a system unit 112, a controller 114, a charging unit 116, a battery 118, and a discharge switching unit 120. A person of ordinary skill in the art should understand and appreciate that all the units shown can be discretely arranged or the functionality could be provided by units having more than one function.

Referring again to FIG. 1, as the system is powered on, the system specification information acquiring unit 100 acquires specification information about the system. Here, the specification information on the system can be information on processing speeds of a CPU, a graphic chipset, and a memory, just to name a few possible examples.

The load level determining unit 102 compares a system specification with a reference value and determines a load level of the system. That is, the load level determining unit 102 compares a processing speed of the CPU with a reference value and, depending on the comparison result, determines a load level of the CPU. Also, the load level determining unit 102 determines load levels of the graphic chipset and memory in a similar manner.

The constant power level searching unit 104 searches a values in storage which preferably comprises a table representing a constant power level by load level for a constant power level corresponding to the determined load level. Here, the table can additionally represent, for example, operation enable signals of elements within a constant power level changing circuit, by a constant power level. These values can be also represented by a separate table.

The circuit element operation enable signal searching unit 106 searches the table for the operation enable signals of the elements within the constant power level changing circuit for change into the searched constant power level, and outputs the searched operation enable signals to the constant power level adaptive changing unit 108.

Still referring to FIG. 1, the constant power level adaptive changing unit 108 changes a circuit time constant using the searched operation enable signals of the elements within the constant power level changing circuit. By doing so, the constant power level adaptive changing unit 108 adaptively changes a constant power level of the system into the searched constant power level.

The adapter connecting unit 110 connects an adapter (not shown) that is an external power source to the system, and receives a supply of a power from the external power source via the adapter connecting unit, and supplies the power source to the system unit 112.

The system unit 112 receives the supply of power from the external power source via the adapter (not shown) through the adapter connecting unit 110. If the external power source (not shown) is not supplied via the adapter (not shown), the system unit 112 may receive a supply of a power from the battery 118.

If the power source from the adapter (not shown) is supplied to the system unit 112 via the adapter connecting unit 110, the controller 114 transmits a discharge off signal (DIS_OFF) to the discharge switching unit 120, thus switching off the discharge switching unit 120. This reason for switching off the discharge switching unit is to supply the power source from the battery 110 to the system unit 112 when it is impossible to supply the power source from the adapter (not shown). If there is a need to supply power from the battery 118 as above, the controller 114 transmits a discharge on signal (DIS_ON) to the discharge switching unit 120, thus switching on the discharge switching unit 120. Also, if the external power source from the adapter (not shown) is supplied to both the battery 118 and the system unit 112, the controller 114 preferably controls an intensity of the power source, which is supplied to the battery 118 through the charging unit 116, according to a constant power level adaptively changed by the constant power level adaptive changing unit 108. In other words, in this example the controller 114 controls the charging unit 116 to charge the battery 118 with a constant power according to the adaptively changed constant power level.

The charging unit 116 charges the battery 118 with power from the adapter (not shown) through the adapter connecting unit 110, under control of the controller 114.

Still referring to FIG. 1, the battery 118 is charged by receiving a supply of a power source from the charging unit 116. After that, the battery 118 supplies the charge power source to the system unit 112, under control of the discharge switching unit 120.

The discharge switching unit 120 is switched on or off depending on the discharge on/off signal (DIS_ON/OFF) received from the controller 114, thus controlling discharge of the battery 118. That is, the discharge switching unit 120 controls the battery 118 to supply the power source to the system unit 112.

If a power source is supplied to the system unit 112 in accordance with system driving and simultaneously intends to charge the battery 118, the apparatus determines a load level of the system unit 112 using system specification information, adaptively changes a constant power level according to the determined load level, and charges the battery 118 with a constant power according to the adaptively changed constant power level, thereby being capable of charging the battery 118 and simultaneously, stably supplying power from the power source even to the system unit 112.

Figure 2:
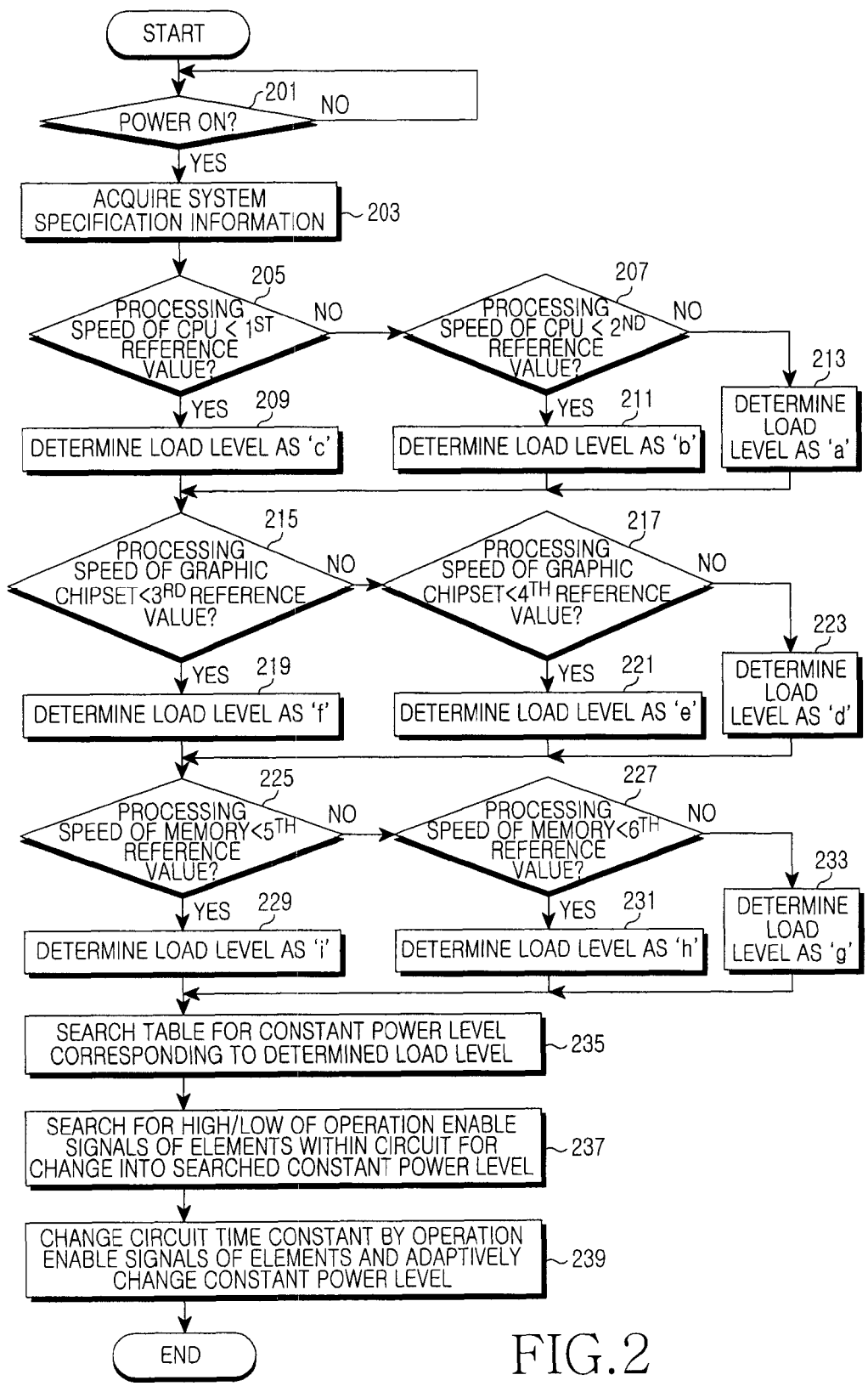
FIG. 2 is a flow diagram illustrating a procedure of a method for adaptively changing a constant power level in compliance with a system specification according to an exemplary embodiment of the present invention.

FIG. 2 is a flow diagram illustrating an exemplary procedure of a method for adaptively changing a constant power level in compliance with a system specification according to an exemplary embodiment of the present invention.

Referring now to FIG. 2, in step 201, an apparatus for adaptive changing a constant power level determines if a system is powered on. If the system is powered on, in step 203, the apparatus acquires specification information on the system. The specification information about the system can be information regarding processing speeds of a CPU, a graphic chipset, a memory, etc., for example.

Then, in step 205, the apparatus determines if the processing speed of the CPU is less than a $1^{st}$ reference value. If the processing speed of the CPU is less than the $1^{st}$ reference value, in step 209, the apparatus determines a load level of the CPU as 'c'. On the contrary, if the processing speed of the CPU is not less than the $1^{st}$ reference value, in step 207, the apparatus determines if the processing speed of the CPU is less than a $2^{nd}$ reference value. If the processing speed of the CPU is not less than the $1^{st}$ reference value but is less than the $2^{nd}$ reference value, in step 211, the apparatus determines the load level of the CPU as 'b'. On the contrary, if the processing speed of the CPU is not less than the $2^{nd}$ reference value, in step 213, the apparatus determines the load level of the CPU as 'a'. Here, the $1^{st}$ reference value is set to be less than the $2^{nd}$ reference value.

Then, in step 215, the apparatus determines if the processing speed of the graphic chipset is less than a $3^{rd}$ reference value. If the processing speed of the graphic chipset is less than the $3^{rd}$ reference value, in step 219, the apparatus determines a load level of the graphic chipset as 'f'. On the contrary, if the processing speed of the graphic chipset is not less than the $3^{rd}$ reference value, in step 217, the apparatus determines if the processing speed of the graphic chipset is less than a $4^{th}$ reference value. If the processing speed of the graphic chipset is not less than the $3^{rd}$ reference value but is less than the $4^{th}$ reference value, in step 221, the apparatus determines a load level of the graphic chipset as 'e'. On the contrary, if the processing speed of the graphic chipset is not less than the $4^{th}$ reference value, in step 223, the apparatus determines the load level of the graphic chipset as 'd'. Here, the $3^{rd}$ reference value is set to be less than the $4^{th}$ reference value.

Then, in step 225, the apparatus determines if the processing speed of the memory is less than a $5^{th}$ reference value. If the processing speed of the memory is less than the $5^{th}$ reference value, in step 229, the apparatus determines a load level of the memory as 'i'. On the contrary, if the processing speed of the memory is not less than the $5^{th}$ reference value, in step 227, the apparatus determines if the processing speed of the memory is less than a $6^{th}$ reference value. If the processing speed of the memory is not less than the $5^{th}$ reference value but is less than the $6^{th}$ reference value, in step 231, the apparatus determines the load level of the memory as 'h'. On the contrary, if the processing speed of the memory is not less than the $6^{th}$ reference value, in step 233, the apparatus determines the load level of the memory as 'g'. Here, the $5^{th}$ reference value is set to be less than the $6^{th}$ reference value.

Then, in step 235, the apparatus searches a table representing a constant power level by load level for a constant power level corresponding to the determined load level. The exemplary table representing the constant power level by load level can be configured as in Table 1 below:

TABLE 1

| | Load level | | | Enable | | | Constant power |
| | | Graphic | | | | | |
| Mode | CPU | chipset | Memory | A | B | C | level (Watt) |
| --- | --- | --- | --- | --- | --- | --- | --- |
| 1 | a | d | g | H | L | L | A(High) |
| 2 | a | d | h | H | L | L | A(High) |
| 3 | a | d | i | H | L | L | A(High) |
| 4 | a | e | g | L | H | L | B(Medium) |
| 5 | a | e | h | L | H | L | B(Medium) |
| 6 | a | e | i | L | H | L | B(Medium) |
| 7 | a | f | g | L | L | H | C(Low) |
| 8 | a | f | h | L | L | H | C(Low) |
| 9 | a | f | i | L | L | H | C(Low) |
| 10 | b | d | g | H | L | L | A(High) |
| 11 | b | d | h | H | L | L | A(High) |
| 12 | b | d | i | H | L | L | A(High) |
| 13 | b | e | g | L | H | L | B(Medium) |
| 14 | b | e | h | L | H | L | B(Medium) |
| 15 | b | e | i | L | H | L | B(Medium) |
| 16 | b | f | g | L | L | H | C(Low) |
| 17 | b | f | h | L | L | H | C(Low) |
| 18 | b | f | i | L | L | H | C(Low) |
| 19 | c | d | g | L | H | L | B(Medium) |
| 20 | c | d | h | L | H | L | B(Medium) |
| 21 | c | d | i | L | H | L | B(Medium) |
| 22 | c | e | g | L | L | H | C(Low) |
| 23 | c | e | h | L | L | H | C(Low) |
| 24 | c | e | i | L | L | H | C(Low) |
| 25 | c | f | g | L | L | H | C(Low) |
| 26 | c | f | h | L | L | H | C(Low) |
| 27 | c | f | i | L | L | H | C(Low) |

The table is realized on the basis of expectations of power consumption in compliance with a system specification. The table can additionally represent operation enable signals of elements within a constant power level changing circuit for change into a corresponding constant power level as in Table 1. The elements within the constant power level changing circuit are to adaptively change a constant power level as preferred. For example, a resistance element corresponds to this like the constant power level adaptive changing unit 108 of FIG. 1. The elements are enabled by corresponding operation enable signals (A, B, and C), respectively. High (H) or Low (L) of the operation enable signals (A, B, and C) corresponding to the respective elements are determined by the circuit element operation enable signal searching unit 106. The circuit element operation enable signal searching unit 106 searches for the H/L of the operation enable signals of the elements within the constant power level changing circuit for change into the searched constant power level, using Table 1. A switch is connected by element. The On/Off status of each switch is determined by H/L of an operation enable signal of a corresponding element. In a variation of the exemplary method, without a switch connection, the circuit element operation enable signal searching unit 106 may directly control enabling of each element.

Then, in step 237, the apparatus searches for the H/L of the operation enable signals of the elements within the constant power level changing circuit for change into the searched constant power level, using Table 1.

For example, if the load levels of the CPU, graphic chipset, and memory are determined to be 'c', 'd', and 'h', respectively, a constant power level can be searched as 'B' in Table 1. Also, the operation enable signals (A, B, and C) of the elements within the constant power level changing circuit for change into the searched constant power level 'B' can be searched as 'L', 'H', and 'L', respectively, in Table 1.

Then, in step 239, the apparatus changes a circuit time constant using the searched operation enable signals for the elements within the constant power level changing circuit, thereby completing an adaptive change into the searched constant power level.

Finally, the apparatus terminates the procedure according to the present invention after completing the adaptive change to the constant power level.

In the above and other exemplary embodiments of the present invention, processes of determining load levels of a CPU, a graphic chipset, and a memory can be each performed sequentially or simultaneously.

As described herein above, the present invention has an advantage of being able to minimize the number of kinds of main boards irrespective of the kinds of several CPUs and adaptively change a constant power level in compliance with a system specification, by determining a load level of a system using system specification information, searching for a constant power level corresponding to the determined load level, and changing the constant power level. Further, the present invention has an advantage of being able to optimize a system load, minimize an excess of a capability of an adapter, and prevent overheating, etc., thus improving safety of the system, by adaptively changing a constant power level in compliance with a system specification as disclosed herein above.

While the invention has been shown and described with reference to certain preferred exemplary embodiments thereof, it will be understood by those skilled in the art that various changes in form and details may be made therein without departing from the spirit and scope of the invention as defined by the appended claims.

What is claimed is:

1. A method operative in a processing apparatus including a battery and a system, the method comprising:
   receiving a supply of power from an external power adapter to simultaneously charge the battery and supply power to the system;
   acquiring system specification information of at least one system component that has been changed;
   determining a constant power level to be provided to the system based on the at least one system component that has been changed, corresponding to a load level of the at least one system component, wherein the constant power level is a power level at which the power supplied to the battery is decreased; and
   controlling the supply of power to the battery and to the system in accordance with the determined constant power level, wherein the system specification information includes information regarding a processing speed of at least one of a Central Processing Unit (CPU), a graphic chipset, and a memory, the load level being determined as a function of the processing speed.

2. The method according to claim 1, wherein the system specification information is the most current system specification information since the latest power-up of the system.

3. The method according to claim 1, wherein the system specification information is rechecked at predetermined intervals after the latest power-up of the system.

4. The method of claim 1, wherein determining the constant power level comprises:
   comparing the processing speed with at least one reference value;
   determining the load level depending on the comparison result; and
   searching storage for a constant power level corresponding to the determined load level.

5. The method of claim 4, wherein the storage searched for a constant power level comprises a table.

6. The method of claim 1, wherein the system specification information includes information regarding processing speeds of each of the Central Processing Unit (CPU), the graphic chipset, and the memory, the constant power level being determined as a function of load levels associated with all of the processing speeds.

7. The method of claim 6, wherein determining the constant power level comprises:
   for each of the CPU processing speed, graphic chipset processing speed, and memory processing speed:
   comparing the processing speed to a plurality of reference values each associated with the CPU, graphic chipset or memory, to classify a load level associated with the processing speed: i) falling below a first of the reference values, ii) being within a range between the first of the reference values and a second of the reference values; or iii) being above the second reference value; and
   searching storage for a constant power level corresponding to the set comprising the classified load levels.

8. The method of claim 1, further comprising changing a time constant of a constant power level changing circuit according a value of the determined constant power level.

9. The method of claim 8, wherein changing the time constant of the constant power level changing circuit comprises:
   (i) searching a table for High/Low values of operation enable signals of elements within the constant power level changing circuit corresponding to the searched constant power levels; and
   (ii) outputting an operation enable signal including the searched value and switching on/off a switch connected by each element.

10. An apparatus comprising a processing system and a battery that receive power from an external power adapter, the apparatus further comprising:
    a controller;
    a system specification information acquiring unit for acquiring system specification information of at least one system component that has been changed;
    a constant power level searching unit for searching for a constant power level to be provided to the system based on the at least one system component that has been changed, corresponding to a load level of the at least one the system component, wherein the constant power level is a power level at which the power supplied to the battery is decreased; and
    a constant power level adaptive changing unit for changing a constant power level value supplied to the controller according to the searched constant power level;
    wherein the controller controls the supply of power from the adapter to the battery and processing system in accordance with the changed constant power level, wherein the system specification information is information regarding a processing speed of at least one of a Central Processing Unit (CPU), a graphic chipset, and a memory, the load level being determined as a function of the processing speed.

11. The apparatus according to claim 10, wherein the acquired system specification information is the most current system specification information since the latest power-up of the system.

12. The apparatus according claim 10, wherein the system specification information is rechecked by the system specification unit according to predetermined intervals after the latest power-up of the system to update the constant power level when the system specification information changes.

13. The apparatus of claim 10, further comprising a load level determining unit for comparing the acquired system specification information with a reference value and determining a load level depending on the comparison result,
wherein the constant power level searching unit searches a table for a constant power level corresponding to the determined load level so as to update the constant power level of the system if needed.

14. The apparatus of claim 10, wherein the constant power level adaptive changing unit changes a time constant of a constant power level changing circuit according to the searched constant power level and changes the constant power level value supplied to the controller in accordance with the searched constant power level.

15. The apparatus of claim 14, further comprising a circuit element operation enable signal searching unit for searching a table for High/Low values of operation enable signals of elements within the constant power level changing circuit corresponding to the searched constant power levels, and outputting the operation enable signal with the searched value,
wherein the constant power level adaptive changing unit switches on/off a switch connected by each element depending on the operation enable signal and changes the time constant of the constant power level changing circuit.

16. The apparatus of claim 10, wherein the system specification information is information regarding processing speeds of each of the Central Processing Unit (CPU), the graphic chipset, and the memory, the constant power level being determined as a function of load levels associated with all of the processing speeds.

17. The apparatus of claim 16, wherein the system specification information includes information regarding processing speeds of each of the CPU, the graphic chipset, and the memory, the constant power level being determined as a function determining the constant power level comprises:
for each of the CPU processing speed, graphic chipset processing speed, and memory processing speed:
comparing the processing speed to a plurality of reference values each associated with the CPU, graphic chipset and memory, to classify a load level associated with the processing speed: i) falling below a first of the reference values, ii) being within a range between the first of the reference values and a second of the reference values; or iii) being above the second reference value; and
searching storage for a constant power level corresponding to the set comprising the classified load levels.

18. A method operative in a processing apparatus including a battery and a system, the method comprising:
receiving a supply of power from an external power adapter to supply power to the system;
acquiring system specification information of at least one system component that has been changed;
determining a constant power level to be provided to the system based on the at least one system component that has been changed, corresponding, corresponding to a load level of the at least one system component, wherein the constant power level is a power level at which the power supplied to the battery is decreased; and
controlling the supply of power to the system in accordance with the determined constant power level,
wherein the system specification information is information regarding a processing speed of at least one of a Central Processing Unit(CPU), the load level being determined as a function of the processing speed.

* * * * *

UNITED STATES PATENT AND TRADEMARK OFFICE
CERTIFICATE OF CORRECTION

| | | |
|---|---|---|
| PATENT NO. | : 8,276,001 B2 | Page 1 of 1 |
| APPLICATION NO. | : 12/609254 | |
| DATED | : September 25, 2012 | |
| INVENTOR(S) | : Jong-Min Kim | |

It is certified that error appears in the above-identified patent and that said Letters Patent is hereby corrected as shown below:

Item 54 on the Title Page should read as follows:
--...METHOD FOR CONTROLLING POWER...--

In the Claims:

Column 8, Claim 10, Lines 59-60 should read as follows:
--...at least one system component...--

Column 10, Claim 18, Line 31 should read as follows:
--...has been changed, corresponding to a...--

Signed and Sealed this
Fourteenth Day of May, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,276,001 B2  
APPLICATION NO. : 12/609254  
DATED : September 25, 2012  
INVENTOR(S) : Jong-Min Kim Page 1 of 1

It is certified that error appears in the above-identified patent and that said Letters Patent is hereby corrected as shown below:

Title Page, Item (54) and in the specification, column 1, lines 1-3, Title, should read as follows:
--...METHOD FOR CONTROLLING POWER...--

In the Claims:

Column 8, Claim 10, Lines 59-60 should read as follows:
--...at least one system component...--

Column 10, Claim 18, Line 31 should read as follows:
--...has been changed, corresponding to a...--

This certificate supersedes the Certificate of Correction issued May 14, 2013.

Signed and Sealed this  
Eleventh Day of June, 2013

Teresa Stanek Rea  
*Acting Director of the United States Patent and Trademark Office*